(12) United States Patent
Shvarts

(10) Patent No.: US 7,304,462 B2
(45) Date of Patent: Dec. 4, 2007

(54) COMPENSATED DROOP METHOD FOR PARALLELING OF POWER SUPPLIES (C-DROOP METHOD)

(75) Inventor: Emanuil Y. Shvarts, Vista, CA (US)

(73) Assignee: Power-One, Inc., Camarillo, CA (US)

( * ) Notice: Subject to any disclaimer, the term of this patent is extended or adjusted under 35 U.S.C. 154(b) by 449 days.

(21) Appl. No.: 11/049,909

(22) Filed: Feb. 2, 2005

(65) Prior Publication Data
US 2006/0171178 A1    Aug. 3, 2006

(51) Int. Cl.
*G05F 1/40*    (2006.01)
(52) U.S. Cl. .................. 323/284; 323/272
(58) Field of Classification Search ............ 323/272, 323/280, 281, 282, 284, 285
See application file for complete search history.

(56) References Cited

U.S. PATENT DOCUMENTS

| | | | |
|---|---|---|---|
| 5,838,151 A | | 11/1998 | Myers et al. |
| 6,404,175 B1 * | | 6/2002 | Yang et al. .................. 323/282 |
| 7,230,406 B2 * | | 6/2007 | Huang et al. ............... 323/284 |
| 2001/0022512 A1 * | | 9/2001 | Tateishi ....................... 323/282 |
| 2006/0038547 A1 * | | 2/2006 | Ahmad ........................ 323/284 |

OTHER PUBLICATIONS

Batarseh et al., Investigation of the Output Droop Characteristics of Parallel-Connected DC-DC Converters, IEEE, pp. 1342-1351, 1994, no month.

* cited by examiner

*Primary Examiner*—Jessica Han
(74) *Attorney, Agent, or Firm*—Robert D. Atkins; Quarles & Brady LLP

(57) ABSTRACT

A power supply has multiple power supply modules connected in parallel. Each power supply module has a power conversion circuit having an input coupled for receiving an input voltage. A resistor is serially coupled in an output of the power conversion circuit. A current limit amplifier has first and second inputs coupled to first and second terminals of the first resistor. A feedback amplifier has a first input coupled for receiving an output voltage of the power supply module, a second input coupled for receiving a reference signal, and an output coupled for providing a feedback signal to the power conversion circuit. A compensation resistor is coupled between an output of the current limit amplifier and the second input of the feedback amplifier for adjusting the reference signal to compensate for variation in output current of the power conversion circuit.

6 Claims, 3 Drawing Sheets

COMPENSATED DROOP METHOD FOR PARALLELING OF POWER SUPPLIES (C-DROOP METHOD)

FIELD OF THE INVENTION

The present invention relates in general to electronic power supplies and, more particularly, to a droop method for connecting two or more power supply modules in parallel.

BACKGROUND OF THE INVENTION

Most modern electronic equipment requires a power supply to provide a direct current (DC) operating potential to the electronic components contained therein. Common types of electronic equipment which use power supplies include personal computers, energy systems, telecommunication systems, audio-video equipment, consumer electronics, automotive components, and other devices which utilize integrated circuits, semiconductor chips, or otherwise require DC operating potential. Most, if not all, semiconductor components require a low voltage DC operating potential. However, many sources of electric power are alternating current (AC), or high voltage DC, which must be converted to low voltage DC for the electronic equipment.

In one common arrangement, the AC/DC power supply receives an AC input voltage, e.g., between 110 and 240 VAC, and converts the AC input voltage to the DC operating voltage. The AC voltage is routed through a full-wave rectifier bridge and filtered to produce a high voltage DC signal. The high voltage DC signal is processed through a pulse width modulated (PWM) controller and transformer assembly to generate the low voltage, regulated DC output voltage, which is used as the operating potential for the semiconductor components and other devices requiring low voltage DC supply in the electronic equipment. The low voltage DC signal is typically in the range of 1 to 12 VDC. In other cases, a DC/DC power supply receives a high voltage DC signal and provides the low voltage DC signal necessary for the electronic equipment.

Power supplies are generally high production units, designed to operate at a specific voltage level, which may be adjustable within a narrow range. The power supply maximum output current capability is set by the design components. Manufacturers sell power supplies over a range of discrete output voltages and output current capability, sometimes specified by a power rating. To select a power supply, the original equipment manufacturer (OEM) will select the desired power supply from the vendor's catalog. If the available power supplies do not have the proper power rating for the electronic equipment, then OEMs are known to connect two or more power supply modules in parallel to increase the available output current. The process of connecting power supply modules in parallel can be accomplished using a popular approach known as the droop method. Theoretically, connecting two identical power supply modules in parallel maintains the same output voltage while doubling the output current.

The droop method allows OEMs to increase current capability and use the same standard power supply module for many different maximum load requirements. However, the droop method may lead to poor load regulation among the parallel-connected power supply modules due to the variation in the output voltage and load current of each power supply.

A need exists to connect multiple power supply modules in parallel while maintaining good load regulation.

SUMMARY OF THE INVENTION

In one embodiment, the present invention is a power supply having a plurality of power supply modules connected in parallel. Each power supply module includes a power conversion circuit having an input coupled for receiving an input voltage and an output providing an output voltage of the power supply module. A first resistor is serially coupled in the output of the power conversion circuit. A first amplifier has first and second inputs coupled to first and second terminals of the first resistor. A second amplifier has a first input coupled for receiving the output voltage of the power supply module, a second input coupled for receiving a first reference signal, and an output coupled for providing a feedback signal to the power conversion circuit. A second resistor is coupled between an output of the first amplifier and the second input of the second amplifier for adjusting the first reference signal to compensate for variation in output current of the power supply module.

In another embodiment, the present invention is a compensation circuit in a power supply module which has a power conversion circuit for converting an input voltage to an output voltage. A feedback control loop has a first input coupled for receiving the output voltage of the power supply module, a second input coupled for receiving a reference signal, and an output coupled for providing a feedback signal to the power conversion circuit for controlling its output voltage. A current sensor is coupled in an output of the power conversion circuit and having an output coupled to the feedback control loop for adjusting the reference signal to compensate for variation in output current of the power supply module.

In another embodiment, the present invention is a power supply having a plurality of power supply modules connected in parallel. At least one of the power supply modules comprises a power train having an input coupled for receiving an input voltage and an output for providing an output voltage. A control circuit controls energy transfer through the power train. A feedback control loop is coupled between the output of the power train and an input of the control circuit. A current sensor is responsive to an output current of the power train for compensating the feedback control loop.

In another embodiment, the present invention is a method of compensating an output voltage of a power supply module comprising monitoring an output current of the power supply module, generating a compensation voltage representative the output current of the power supply module, controlling an output voltage of the power supply module by comparing a signal representative of the output voltage of the power supply module to a reference signal, and utilizing the compensation voltage to adjust the reference signal and compensate for variation in output current of the power supply module.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
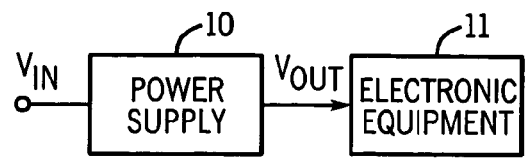
FIG. 1 illustrates a modular power supply providing DC potential to electronic equipment.

Referring to FIG. 1, a power supply 10 is shown providing a DC operating potential to electronic equipment 11. Power supply 10 receives input voltage $V_{IN}$ and produces DC output voltage $V_{OUT}$. The electronic equipment 11 may take the form of personal computers, energy systems, telecommunication systems, audio-video equipment, consumer electronics, automotive components, and other devices which utilize integrated circuits, semiconductor chips, or otherwise require DC operating potential from the power supply.

Figure 2:
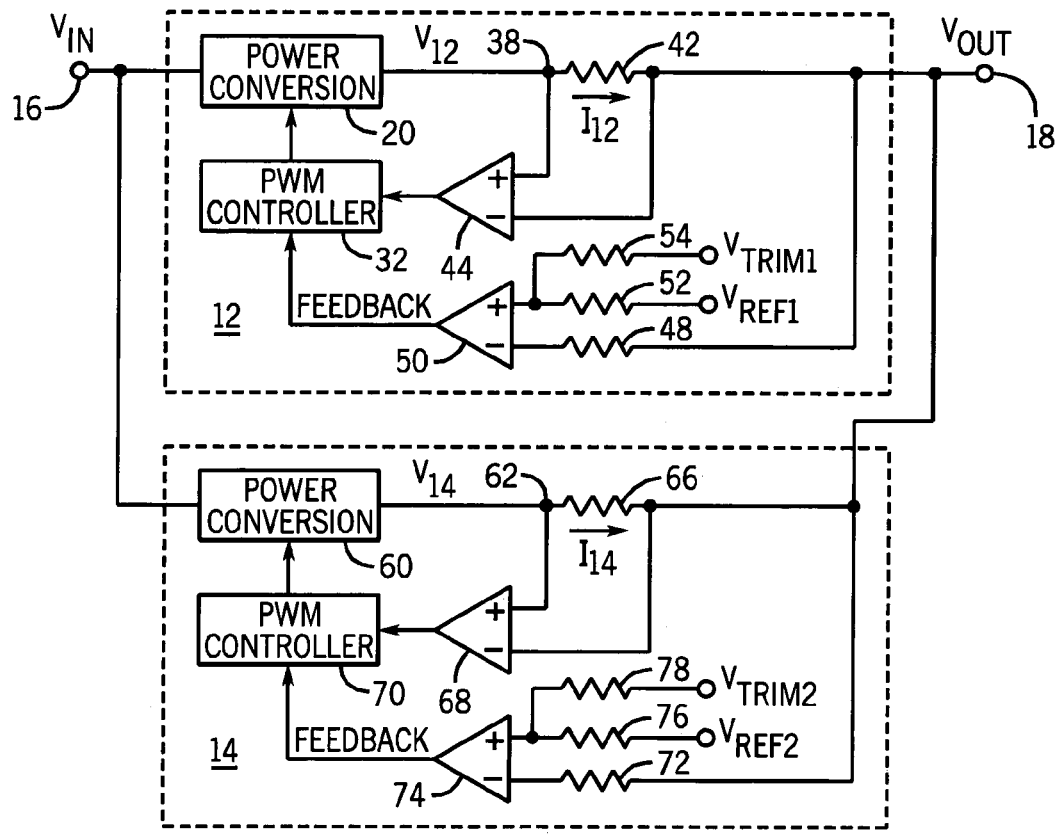
FIG. 2 is a block diagram of a droop method of connecting two power supply modules in parallel.

Further detail of power supply 10 is shown in FIG. 2. Power supply 10 is constructed using power supply module 12 and power supply module 14 connected in parallel. An input voltage $V_{IN}$ is applied to terminal 16, which is commonly connected to an input of power supply module 12 and further to an input of power supply module 14. The output of power supply module 12 and the output of power supply module 14 are commonly connected to terminal 18, which provides the DC output voltage $V_{OUT}$ of power supply 10 to electronic equipment 11.

Figure 3:
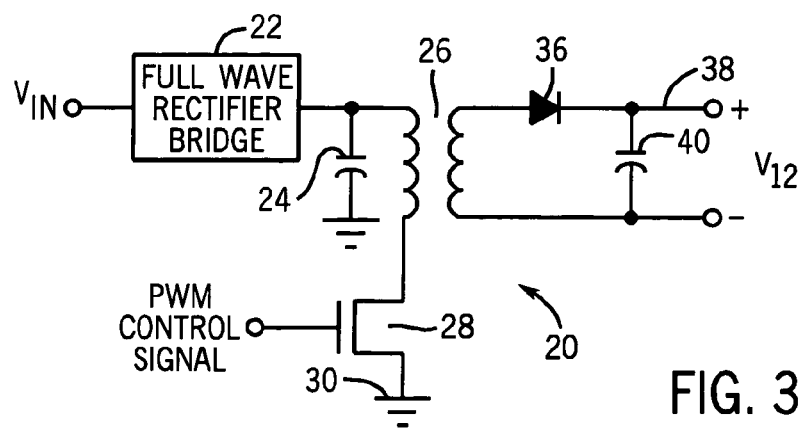
FIG. 3 is a schematic diagram of the power conversion block of FIG. 2.

Power supply module 12 has a power conversion block 20 coupled for receiving the input voltage $V_{IN}$. The input voltage $V_{IN}$ may be an alternating current (AC) signal, e.g., 110 VAC, or direct current (DC) signal, e.g., 48 volts. For the case of an AC input voltage, power conversion block 20 has a full-wave rectifier bridge 22, such as shown in FIG. 3. The full-wave rectifier bridge 22 converts the AC input voltage to a DC voltage. In the case of a DC input voltage, the full-wave rectifier bridge 22 is omitted. Capacitor 24 smoothes and filters the DC voltage. The DC voltage is applied to a primary side of transformer 26. The primary side of transformer 26 is also coupled through power transistor 28 to ground terminal 30. In one embodiment, power transistor 28 is a metal oxide semiconductor field effect transistor (MOSFET). The gate of MOSFET 28 receives a pulse width modulated control signal from pulse width modulator (PWM) controller 32 in FIG. 2. The combination of PWM controller 32 and power conversion block 20 make a complete power conversion circuit. The secondary side of transformer 26 is coupled to rectifier diode 36 to create the DC output voltage $V_{12}$ of power supply module 12 at node 38. Capacitor 40 filters the DC output voltage $V_{12}$.

Returning to FIG. 2, a low-value power resistor 42, e.g., 10-100 milliohms, is serially coupled in the output of power supply module 12 between node 38 and terminal 18. The output current $I_{12}$ of power supply module 12 flows through resistor 42. The output current $I_{12}$ develops a voltage across resistor 42, which in turn is amplified by differential amplifier 44. The output voltage of amplifier 44 is a current limit signal representative of the output current $I_{12}$ of power supply module 12. The current limit signal is applied to current limit input of PWM controller 32 for early termination of the PWM control cycles in the event of an over current condition. If the output voltage of current limit amplifier 44 exceeds a predetermined threshold, then PWM controller 32 suppresses one or more charging cycles of power conversion block 20.

The output voltage $V_{OUT}$ from terminal 18 is applied through resistor 48 to an inverting input of differential amplifier 50. A reference voltage $V_{REF1}$ is applied through resistor 52 to a non-inverting input of amplifier 50. Likewise, a trim voltage $V_{TRIM1}$ is applied through resistor 54 to the non-inverting input of amplifier 50. The combination of the reference voltage $V_{REF1}$ applied to resistor 52 and the trim voltage $V_{TRIM1}$ applied through resistor 54 creates a composite reference at the non-inverting input of amplifier 50. The output voltage $V_{OUT}$ is compared to the composite reference and a feedback signal is applied to a feedback input of PWM controller 32.

PWM controller 32 sets the conduction time duty cycle of MOSFET 28 to store energy in the primary side of transformer 26 and then transfer the stored energy to the secondary side during the off-time of MOSFET 28. The output voltage $V_{12}$ is determined by the energy transfer between the primary and secondary side of transformer 26. The energy transfer is regulated by PWM controller 32 via the duty cycle of the PWM control signal to MOSFET 28. Amplifier 50 sets the feedback control to PWM controller 32 based on the comparison between the output voltage $V_{OUT}$ and the composite reference signal as applied to the non-inverting input of amplifier 50. Therefore, the reference voltage $V_{REF1}$ sets the base output voltage $V_{12}$. The trim voltage $V_{TRIM1}$ is used to trim or adjust the output voltage $V_{12}$ over a range of ±10-20%.

Power supply module 14 has a similar construction and operation as described for power supply module 12. Power supply module 14 has a power conversion block 60 coupled for receiving the input voltage $V_{IN}$. The power conversion block 60 is similar to the embodiment of FIG. 3 and provides a DC output voltage $V_{14}$ at node 62. A low-value power resistor 66, e.g., 10-100 milliohms, is serially coupled in the output of power supply module 14 between node 62 and terminal 18. The output current $I_{14}$ of power supply module 14 flows through resistor 66. The output current $I_{14}$ develops a voltage across resistor 66, which in turn is amplified by differential amplifier 68. The output voltage of amplifier 68 is a current limit signal representative of the output current $I_{14}$ of power supply module 14. The current limit signal is applied to current limit input of PWM controller 70 for early termination of the PWM control cycles in the event of an over current condition. If the output voltage of current limit amplifier 68 exceeds a predetermined threshold, then PWM controller 70 suppresses one or more charging cycles of power conversion block 60.

The output voltage $V_{OUT}$ from terminal 18 is applied through resistor 72 to an inverting input of differential amplifier 74. A reference voltage $V_{REF2}$ is applied through resistor 76 to a non-inverting input of amplifier 74. Likewise, a trim voltage $V_{TRIM2}$ is applied through resistor 78 to the non-inverting input of amplifier 74. The combination of the reference voltage $V_{REF2}$ applied to resistor 76 and the trim voltage $V_{TRIM2}$ applied through resistor 78 creates a composite reference at the non-inverting input of amplifier 74. The output voltage $V_{OUT}$ is compared to the composite reference and a difference signal is applied to a feedback input of PWM controller 70. As described above, the reference voltage $V_{REF2}$ sets the base output voltage $V_{14}$. The trim voltage $V_{TRIM2}$ is used to trim or adjust the output voltage $V_{14}$ over a range of ±10-20%.

Power supply modules 12 and 14 may be standard units each having known input voltage, output voltage, output current rating, and power ratings. For example, the power supply module may have a standard output voltage and current of 2.5 volt at 5 amps or 3.3 volt at 10 amps. If the user needs more output current for a given voltage, multiple power supply modules are connected in parallel for the additional current demand capability. In some cases, two to six power supply modules are connected in parallel to achieve the desired current demand.

In the present embodiment; and depending on the power requirements of electronic equipment 11, power supply module 12 or power supply module 14 individually may not have sufficient power rating to supply electronic equipment 11. For design and manufacturing efficiencies, instead of increasing or customizing the power rating of power supply module 12 or 14, the power supply modules have their respective inputs and outputs coupled together to increase the total power rating of power supply 10. Power supply 10 then provides the DC operating potential and current drive capability for electronic equipment 11.

In other applications, the power supply modules are connected in parallel for redundancy and reliability. If one unit fails, the other power supply modules are available to keep the electronic equipment operational.

The process of connecting power supply modules 12 and 14 in parallel is known as the droop method, which is based on increasing output resistance of each of N-paralleled power supply module, where N is an integer. The droop method allows separate power supply modules to work in parallel, without overtaxing one unit or the other. If one power supply has a higher output voltage, the feedback control loop will cause it to maintain its output voltage and, in doing so, provide a proportionate amount of the current. The method of paralleling power supply modules is also known as wireless in that there is no wire connections between paralleled modules with associated power losses.

In the droop method, the resistor in series with the output increases in voltage drop as output current increases. If the trimmed output voltage of power supply modules 12 and 14 are dissimilar, as the load current increases, the power supply with the higher output voltage will supply the majority of the load current. At some point the voltage drop across resistors 42 and 66 will make up the difference between $V_{12}$ and $V_{14}$. In that case, $V_{12}-I_{12}*R_{42}=V_{14}-I_{14}*R_{66}=V_{OUT}$ and the power supply modules 12 and 14 will provide the same incremental change in total output current. In other words, the power supply modules will share the total load current once the voltage drops across resistors 42 and 66 caused by the difference in output current cancel any voltage difference between $V_{12}$ and $V_{14}$. In other cases, the values of resistors 42 and 66 can be selected to optimize the load balancing between power supply modules 12 and 14.

The droop method provides for simplicity of schematic implementation and absence of any special input/output (I/O) pin for connecting devices in parallel, which simplifies system design and allows designer to connect power supply modules in parallel with standardized pin-out.

The output voltage $V_{OUT}$ is given in equation (1) as:

$$V_{OUT}=V_m-(R_o*I_m) \quad (1)$$

where: $V_m$ is output voltage of module m
$R_o$ is output resistance of the module
$I_m$ is output current of module m With total load current $I_o$ and module output resistance $R_o$, the load regulation will be $I_{MAX}*R_o/N$ for N modules connected in parallel, according to equation (1). A primary disadvantage of the droop method described in FIG. 2 is the fact that the output voltage $V_{OUT}$ goes down with increasing load. Load regulation for the droop method is usually 3-10%, which may not be acceptable in many applications. For the droop method in FIG. 2, load regulation should be 5-10 times bigger than overall tolerance of $V_{OUT}$ for single power supply to provide acceptable quality of current sharing. The tolerance may involve influences such as sample-to-sample tolerance, line regulation, aging tolerance, and temperature tolerance.

Figure 4:
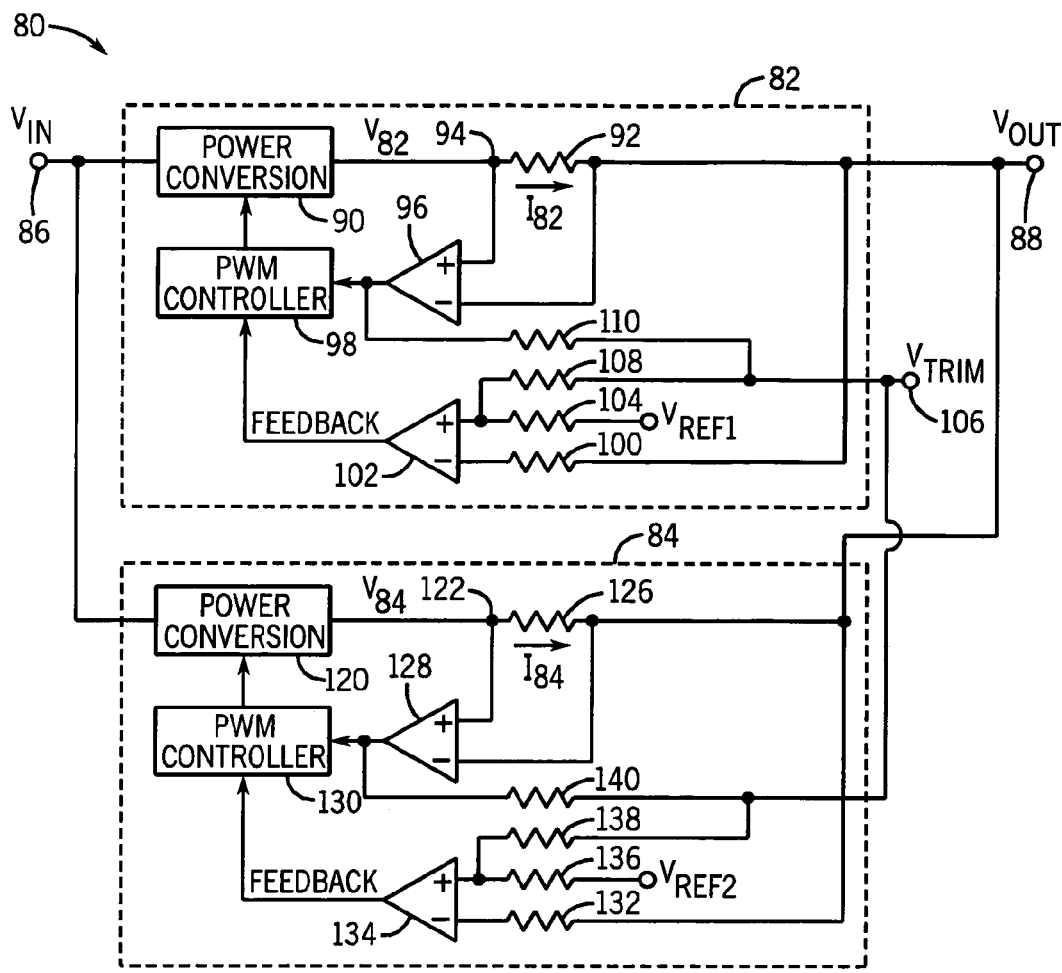
FIG. 4 is a circuit schematic of a droop method using a compensation voltage representative of output current to adjust the reference signal in the feedback path.

Turning to FIG. 4, power supply 80 is constructed using power supply module 82 and power supply module 84 connected in parallel. Power supply 80 provides DC operating potential to electronic equipment like 11. The input voltage $V_{IN}$ is applied to terminal 86, which is commonly connected to an input of power supply module 82 and further to an input of power supply module 84. The output of power supply module 82 and the output of power supply module 84 are commonly connected to terminal 88, which provides the DC output voltage $V_{OUT}$ of power supply 80.

Power supply module 82 has a power conversion block 90 coupled for receiving the input voltage $V_{IN}$. Again, the input voltage $V_{IN}$ may be an AC signal or DC signal. Power conversion block 90 follows a similar construction and operation as power conversion block 20 to provide output voltage $V_{82}$. A low-value power resistor 92, e.g., 10-100 milliohms, is serially coupled in the output of power supply module 82, between node 94 and terminal 88. The output current $I_{82}$ of power supply module 82 flows through resistor 92. The output current $I_{82}$ develops a voltage across resistor 92, which in turn is amplified by differential amplifier 96. The output voltage of amplifier 96 is a current limit signal representative of the output current $I_{82}$ of power supply module 82. The current limit signal is applied to current limit input of PWM controller 98 for early termination of the PWM control cycles in the event of an over current condition. If the output voltage of current limit amplifier 96 exceeds a predetermined threshold, then PWM controller 98 suppresses one or more charging cycles of power conversion block 90. The combination of PWM controller 98 and power conversion block 90 make a complete power conversion circuit.

The output voltage $V_{OUT}$ from terminal 88 is applied through resistor 100 to an inverting input of differential amplifier 102. A reference voltage $V_{REF1}$ is applied through resistor 104 to a non-inverting input of amplifier 102. Likewise, a trim voltage $V_{TRIM}$ is applied to I/O pin 106 of power supply 80 and through resistor 108 to the non-inverting input of amplifier 102. The combination of the reference voltage $V_{REF1}$ applied to resistor 104 and the trim voltage $V_{TRIM}$ applied through resistor 108 creates a composite reference at the non-inverting input of amplifier 102. The output voltage $V_{OUT}$ is compared to the composite reference and a difference signal is applied to a feedback input of PWM controller 98.

Figure 5:
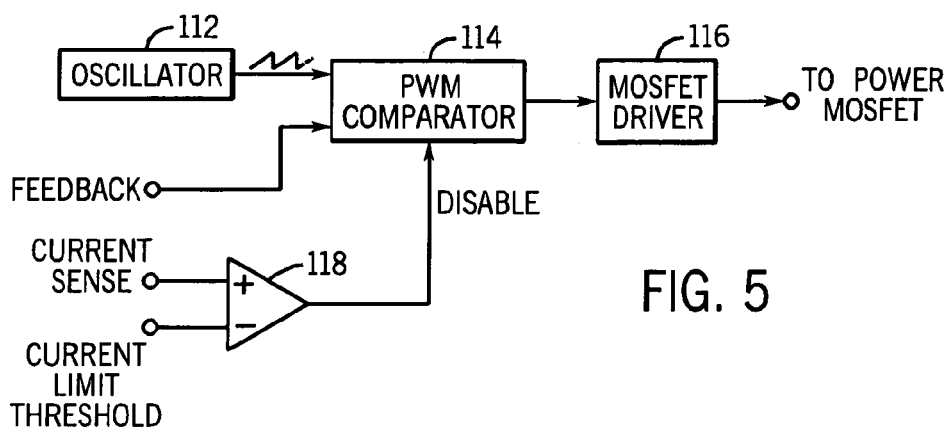
FIG. 5 is a block diagram of the PWM controller of FIG. 4.

Further detail of PWM controller 98 is shown in FIG. 5. Oscillator 112 provides a sawtooth waveform to a first input of PWM comparator 114. The second input of PWM comparator 114 receives the feedback signal from the output of amplifier 102. PWM comparator 114 provides a PWM control signal to MOSFET driver 116 which drives the power MOSFET in the power conversion block. The current sense signal from amplifier 96 is applied to the non-inverting input of amplifier 118. A current limit threshold is applied to the inverting input of amplifier 118. Amplifier 118 provides a signal to disable the output of PWM comparator 114 when the output current of the power supply exceeds the current limit threshold.

PWM controller 98 sets the conduction time duty cycle of the power MOSFET to store energy in the primary side of the transformer and then transfer the stored energy to the secondary side during the off-time of the power MOSFET. The output voltage $V_{82}$ is determined by the energy transfer between the primary and secondary side of the transformer. The energy transfer is regulated by PWM controller 98 via the duty cycle of the PWM control signal to the power MOSFET. Amplifier 102 sets the feedback control to PWM controller 98 based on the comparison between the composite reference and the output voltage $V_{OUT}$. Therefore, the reference voltage $V_{REF1}$ sets the base output voltage $V_{82}$. The trim voltage $V_{TRIM}$ is used to trim or adjust the output voltage $V_{82}$ over a range of ±10-20%.

As a new feature, compensation resistor 110 ($R_{comp}$) is connected between the output of current limit amplifier 96 and I/O trim pin 106, which is also connected through resistor 108 to the non-inverting input of amplifier 102. The output voltage of amplifier 96 is proportional to the output current $I_{82}$ of power supply module 82. In one embodiment, as current $I_{82}$ goes from 0-10 amps, the output voltage of amplifier 96 goes from 0-10 volts in a substantially linear manner. By connecting resistor 110 to I/O trim pin 106 and resistor 108, the output voltage of amplifier 96 influences the effective reference voltage on the non-inverting input of amplifier 102. The output voltage of amplifier 96 is used to compensate the output voltage $V_{OUT}$ for increasing load and corresponding increased output current.

Consider the case where the load increases from zero to some nominal value. As load increases, the output current $I_{82}$ increases and the output voltage $V_{OUT}$ decreases. As the output current $I_{82}$ increases, the output voltage of amplifier 96 increases. As the output voltage of amplifier 96 increases, the current through resistor 110 increases. The resistor 110 current operates to increase the effective reference voltage on the non-inverting input of amplifier 102. The higher reference voltage causes the feedback signal to be active longer before reaching the reference threshold. With the longer feedback signal causes PWM controller 98 to increase the pulse width to the MOSFET in power conversion block 90, which transfers more energy to the secondary side of the transformer. The output voltage $V_{82}$ of power supply module 82 increases to compensate for the increased current demand. Accordingly, the output voltage of amplifier 96 operating with resistor 110 provides a compensation signal representative of, e.g. proportional to, current demand to adjust the reference voltage of the feedback amplifier and thereby adjust the output voltage of power supply module 82 to accommodate the current demand. The load regulation improves by using current limit amplifier 96 and compensation resistor 110 to adjust the reference voltage of the feedback amplifier and compensate for varying loads.

Power supply module 84 has a similar construction and operation as described for power supply module 82. Power supply module 84 has a power conversion block 120 coupled for receiving the input voltage $V_{IN}$. The power conversion block 120 is similar to the embodiment of FIG. 3 and provides a DC output voltage $V_{84}$ at node 122. A low-value power resistor 126, e.g., 10-100 milliohms, is serially coupled in the output of power supply module 84 between node 122 and terminal 88. The output current $I_{84}$ of power supply module 84 goes through resistor 126. The output current $I_{84}$ develops a voltage across resistor 126, which in turn is amplified by differential amplifier 128. The output voltage of amplifier 128 is a current limit signal representative of the output current $I_{84}$ of power supply module 84. The current limit signal is applied to current limit input of PWM controller 130 for early termination of the PWM control cycles in the event of an over current condition. If the output voltage of current limit amplifier 126 exceeds a predetermined threshold, then PWM controller 130 suppresses one or more charging cycles of power conversion block 120. PWM controller 130 follows a similar construction and operation as PWM controller 98. The combination of PWM controller 130 and power conversion block 120 make a complete power conversion circuit.

The output voltage $V_{OUT}$ from terminal 88 is applied through resistor 132 to an inverting input of differential amplifier 134. A reference voltage $V_{REF2}$ is applied through resistor 136 to a non-inverting input of amplifier 134. Likewise, a trim voltage $V_{TRIM}$ is applied to I/O trim pin 106 of power supply 80 and through resistor 138 to the non-inverting input of amplifier 134. The combination of the reference voltage $V_{REF2}$ applied to resistor 136 and the trim voltage $V_{TRIM}$ applied through resistor 138 creates a composite reference at the non-inverting input of amplifier 134. The output voltage $V_{OUT}$ is compared to the composite reference and a difference signal is applied to a feedback input of PWM controller 130.

PWM controller 130 sets the conduction time duty cycle of the power MOSFET to store energy in the primary side of the transformer and then transfer the stored energy to the secondary side during the off-time of the power MOSFET. The output voltage $V_{84}$ is determined by the energy transfer between the primary and secondary side of the transformer. The energy transfer is regulated by PWM controller 130 via the duty cycle of the PWM control signal to the power MOSFET. Amplifier 134 sets the feedback control to PWM controller 130 based on the comparison between the composite reference and the output voltage $V_{OUT}$. Therefore, the reference voltage $V_{REF2}$ sets the base output voltage $V_{84}$. The trim voltage $V_{TRIM}$ is used to trim or adjust the output voltage $V_{84}$ over a range of ±10-20%.

As another new feature, compensation resistor 140 ($R_{comp}$) is connected between the output of current limit amplifier 128 and I/O trim pin 106, which is connected through resistor 138 to the non-inverting input of amplifier 134. The output voltage of amplifier 128 is proportional to the output current $I_{84}$ of power supply module 84. In one embodiment, as current $I_{84}$ goes from 0-10 amps, the output voltage of amplifier 128 goes from 0-10 volts in a substantially linear manner. By connecting resistor 140 to I/O trim pin 106 and resistor 138, the output voltage of amplifier 128 influences the effective reference voltage on the non-inverting input of amplifier 134. The output voltage of amplifier 128 is used to compensate the output voltage $V_{OUT}$ for increasing load and corresponding increased output current.

In one embodiment, I/O pin 106 and the trim voltage $V_{TRIM}$ is common to resistors 110 and 140. Connecting all trim pins together may improve accuracy. Alternatively, independently controlled trim voltages may be applied to power supply modules 82 and 84, respectively.

As described above for power supply module 82, as load increases, the output current $I_{84}$ increases and the output voltage $V_{OUT}$ decreases. As the output current $I_{84}$ increases, the output voltage of amplifier 128 increases. As the output voltage of amplifier 128 increases, the current through resistor 140 increases. The resistor 140 current operates to increase the effective reference voltage on the non-inverting input of amplifier 134. The higher reference voltage causes the feedback signal to be active longer before reaching the reference threshold. With the longer feedback signal causes PWM controller 130 to increase the pulse width to the MOSFET in power conversion block 120, which transfers more energy to the secondary side of the transformer. The output voltage $V_{84}$ of power supply module 84 increases to compensate for the increased current demand. Accordingly, the output voltage of amplifier 128 operating with resistor 140 provides a compensation signal representative of current demand to adjust the reference voltage of the feedback amplifier and thereby adjust the output voltage of power supply module 84 to accommodate the current demand. The load regulation improves by using current limit amplifier 128 and compensation resistor 140 to adjust the reference voltage of the feedback amplifier and compensate for varying loads.

Now consider the operation of power supply module 82 and power supply module 84 connected in parallel. As described above, the output of each current limit amplifier is connected through a compensation resistor to the I/O trim pin 106. Note that the output voltage $V_{OUT}$ decreases with increasing load current, i.e., current demand from electronic equipment 11. Equation (1) is approximately equal to:

$$V_{OUT} = V_m - (R_o * I_o)/N \quad (2)$$

where: $V_m$ is output voltage of module m
$R_o$ is output resistance of the module
$I_o$ is total output current
N is the number of modules connected in parallel
$V_{OUT}$ is output voltage of the module As set forth in the discussion of power supply modules 82 and 84, all output voltages $V_m$ are trimmed depending on load current, so the output voltage become equal to:

$$V_{OUT} = V_m + (K * I_o) - (R_o * I_o)/N \quad (3)$$

where: $V_m$ is output voltage of module m
$R_o$ is output resistance of the module
$I_o$ is total output current
N is the number of modules connected in parallel
K is $R_{comp}/R_{trim}$
$R_{trim}$ is equivalent internal resistance of the adjustment (trimming) circuit From equation (3), to reach fully compensated voltage drop, set $K * I_o = R_o * I_o / N$, which leads to:

$$K = R_o/N \quad (4)$$

The decrease in output voltage with load current can be fully compensated with the use of power supply 80 because of trimming output voltage up proportionally to the load current, see equations (4) and (5). The current limit amplifier and compensation resistor provides an adjustment to the reference for the amplifier in the feedback path to cause the power supply output voltage to increase with increasing load current for each power supply.

Figure 6:
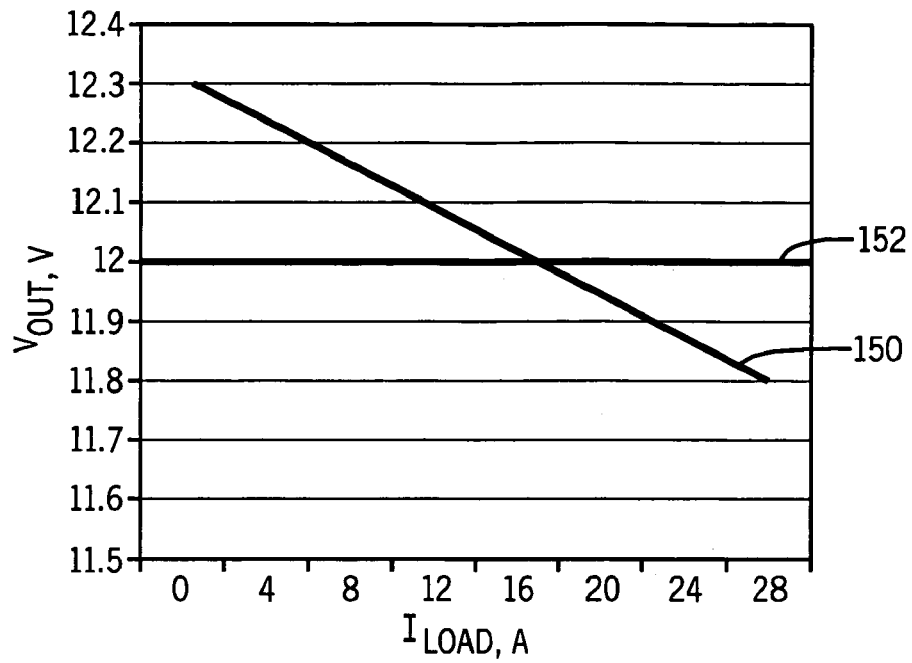
FIG. 6 illustrates load regulation as a function of load current.

In FIG. 6, the load regulation for power supply 10 and power supply 80 is shown. Plot 150 represents the load regulation of power supply 10, and plot 152 represents the load regulation of power supply 80. Power supply 80, using the output voltage of the current limit amplifier as proportional to output current to compensate the reference voltage in the feedback control path, provides enhanced load regulation, i.e., in the range of 0.1%.

Figure 7:
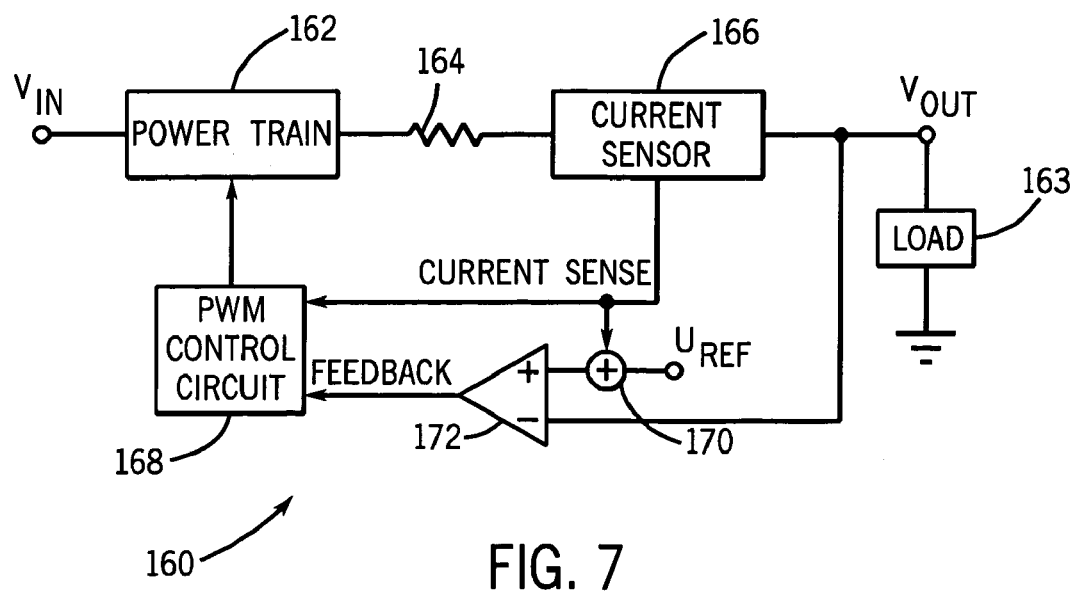
FIG. 7 is a block diagram of the compensated droop method using voltage proportional to the output current to improve load regulation.

A general block diagram of the droop compensation circuit is shown in FIG. 7. Only one power supply module 160 is shown. It is understood that additional power supply module(s) like 160 will be connected in parallel for additional output current capacity. Power train 162 converts the DC input voltage $V_{IN}$ to the DC output voltage $V_{OUT}$. Power train 162 may include components such as full wave rectifier bridge 22, capacitor 24, transformer 26, power MOSFET 28, diode 36, and capacitor 40 as described in FIG. 3. The output voltage of power train 162 is connected to the load through output (droop) resistance 164 and current sensor 166.

Note that resistance 164 may be a physical resistor; or "virtual" droop resistance can be created by known methods, by modifying control circuit. In both cases, the suggested load regulation improvement will be achieved in the same way.

Note also that type and location of the current sensor is not critical. On FIG. 6, the current sensor is shown in series with load current; but we can also use any other known method of current measurement, for example, by sensing MOSFET current, or sensing input current of DC/DC converter, etc.

In one aspect, the current sense signal is routed to PWM controller 168 to control power train 162 should the output current of the power supply exceeds the current limit threshold. PWM controller 168 follows a similar construction as described in FIG. 5. In another aspect, the current sense signal from current sensor 166 is applied to a first input of summing junction 170. A reference voltage $V_{REF}$ is applied to a second input of summing junction 170. The combination of the current sense signal and the reference voltage $V_{REF}$ establishes the signal at the non-inverting input of amplifier 172. The output voltage $V_{OUT}$ is applied to the inverting input of amplifier 172. The output signal of amplifier 172 is the feedback signal to PWM controller 168, which controls the duty cycle of the PWM control. Thus, the current sense signal, which is representative of the output current, is introduced into the regulation loop to adjust the reference of the feedback amplifier. In one embodiment, the current sense signal is proportional to the output current of the power supply module. The current sensor 166 detects the output current and adjusts the reference voltage of the feedback amplifier in the feedback regulation loop to compensate voltage drop inherent to the traditional droop method.

It should be noted that PWM method is used in FIG. only because it is a most popular one. Any other method can be used as well for the suggested idea of output voltage compensation, including but not limited to frequency modulation.

While one or more embodiments of the present invention have been illustrated in detail, the skilled artisan will appreciate that modifications and adaptations to those embodiments may be made without departing from the scope of the present invention as set forth in the following claims.

What is claimed is:

1. A power supply system, having multiple power modules connected in parallel, each power module comprising:
    a power train, with an input connected to an input voltage, and output connected to the load through output droop resistance and current sensor;
    a voltage feedback amplifier, with negative input connected to the output voltage, and positive input connected to the sum of a reference voltage and an output voltage of the current sensor; and
    a control circuit, with one input connected to the output of current sensor, a second input connected to the output of the voltage feedback amplifier, and the output connected to the power train.

2. A power supply having a plurality of power supply modules connected in parallel, each power supply module comprising:

a power conversion circuit having an input coupled for receiving an input voltage and an output providing an output voltage of the power supply module;

a first resistor serially coupled in the output of the power conversion circuit;

a first amplifier having first and second inputs coupled to first and second terminals of the first resistor;

a second amplifier having a first input coupled for receiving the output voltage of the power supply module, a second input coupled for receiving a first reference signal, and an output coupled for providing a feedback signal to the power conversion circuit;

a second resistor coupled between an output of the first amplifier and the second input of the second amplifier for adjusting the first reference signal to compensate for variation in output current of the power supply module;

an I/O trim pin coupled for receiving a trim voltage; and a third resistor coupled between the I/O trim pin and the second input of the second amplifier.

3. In a power supply module having a power conversion circuit for converting an input voltage to an output voltage, a compensation circuit comprising:

a feedback control loop having a first input coupled for receiving the output voltage of the power supply module, a second input coupled for receiving a reference signal, and an output coupled for providing a feedback signal to the power conversion circuit for controlling its output voltage;

a current sensor coupled in an output of the power conversion circuit and having an output coupled to the feedback control loop for adjusting the reference signal to compensate for variation in output current of the power supply module;

a first resistor serially coupled in the output of the power conversion circuit;

a first amplifier having first and second inputs coupled to first and second terminals of the first resistor;

a second resistor coupled between an output of the first amplifier and the second input of the feedback control loop;

an I/O trim pin coupled for receiving a trim voltage; and a third resistor coupled between the I/O trim pin and the second input of the feedback control loop.

4. A method of compensating an output voltage of a power supply module, comprising:

monitoring an output current of the power supply module;

generating a compensation voltage representative the output current of the power supply module;

controlling an output voltage of the power supply module by comparing a signal representative of the output voltage of the power supply module to a reference signal;

utilizing the compensation voltage to adjust the reference signal and compensate for variation in output current of the power supply module; and adjusting the reference signal with a trim voltage.

5. The method of claim 4, further including providing load regulation of a plurality of power supply modules connected in parallel by adjusting a reference signal with a respective compensation voltage of each power supply module.

6. The method of claim 4, further including connecting a plurality of the power supply modules in parallel.

* * * * *